UNITED STATES PATENT OFFICE.

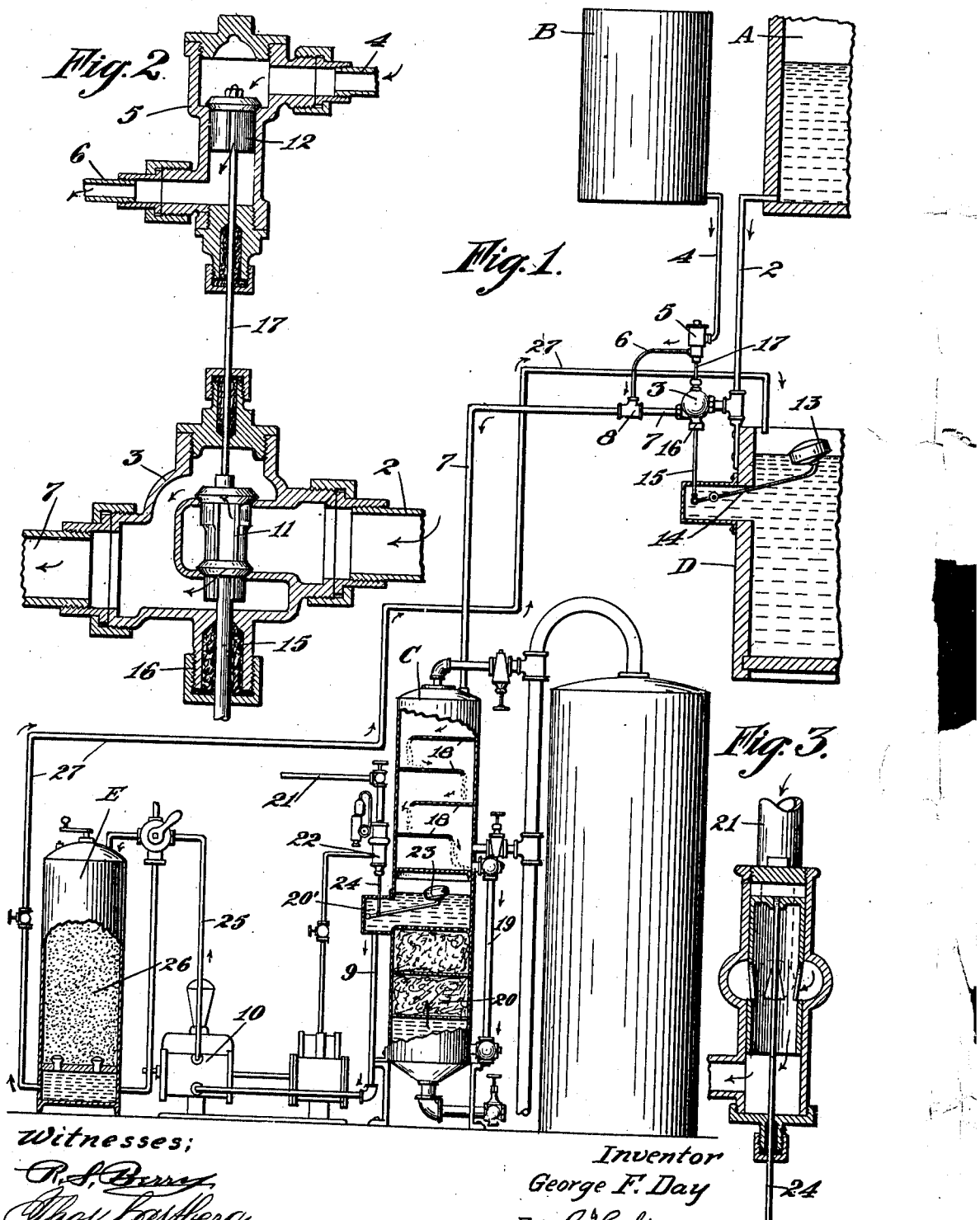

GEORGE F. DAY, OF SAN FRANCISCO, CALIFORNIA.

AUTOMATIC WATER-PURIFIER.

989,235.

Specification of Letters Patent. Patented Apr. 11, 1911.

Application filed June 6, 1910. Serial No. 565,248.

*To all whom it may concern:*

Be it known that I, GEORGE F. DAY, a citizen of the United States, residing in the city and county of San Francisco and State of California, have invented new and useful Improvements in Automatic Water-Purifiers, of which the following is a specification.

My invention relates to an apparatus for the automatic purification of water for use in laundries, or for such purposes as purified water is desirable.

It consists in the combination and arrangement of receptacles for unpurified water, and chemicals to be mixed with the said water, a filtering apparatus, a purified water tank, and an automatically operated mechanism for transmitting the unpurified water, chemicals, and the purified water.

It also consists in details of construction which will be more fully explained by reference to the accompanying drawings, in which—

Figure 1 is a side elevation of the invention, partly in section. Fig. 2 is a sectional view of the differential valves. Fig. 3 is a sectional view of the pump governor valve.

For uses in laundries and for certain other mechanical uses, it is desirable to have substantially pure water, and as most water holds impurities in solution, my apparatus is designed to separate such impurities from the water, and prepare and store purified water in sufficient quantities for the needs of the service to which it is to be applied.

As shown in the drawing, A is a tank into which the unpurified water is delivered, and B is a tank containing the chemicals which, when united with the water in proper proportions, will separate the soluble impurities therefrom.

C is a heater through which the water may be transmitted, and D is a tank into which the purified water is delivered in readiness for use.

The water from the tank A is delivered through a pipe 2, through a valve mechanism contained in the valve chamber 3, and the chemical solution in the tank B is delivered through a pipe 4 into a valve chamber 5. From this valve chamber 5 a pipe 6 leads, and a pipe 7 leads from the valve chamber 3, the two uniting in a T or coupling 8, and thence the mixed liquids flow through the pipe 7 and are delivered into the heater and purifier C. I have here shown a heater and purifier in which the liquid flows over tables within the casing C and is delivered from the lower end through a pipe 9 to a pump 10, and from this pump the liquid is returned through suitable pipe and filter connections into the purified water tank D, controlled as hereafter described.

The valves 11 in the valve chamber 3 may be of any suitable or desired construction. I have here shown two valves upon a single stem, forming a balance valve of such discharge area that a certain proportion of water will pass through these valves. The valve 12 in the valve chamber 5 is so proportioned to the valves 11 that a determined proportion of the solution in the tank B will pass through it and will be united with the water flowing from the tank A through the valves 11, as previously described. These proportions are determined by an analysis of the water and the character of the impurities to be removed.

In order to automatically operate this mechanism, I have shown a float 13, within the tank D. This float has a fulcrumed lever arm 14, and a connecting rod 15 extends from the short arm of the lever through a stuffing-box 16 in the valve chamber 3, and this rod 15 actuates the valve 11.

The valves 11 and 12 are connected by a valve stem 17, passing through suitable stuffing boxes in the two valve chambers so that by the rise and fall of the float 13 the valves are closed or opened to admit the proper proportion of chemicals and water to pass through them. It will be manifest that when the tank D is full of water, these valves will be closed and no action will take place, but when the water is being used from the tank D the float 13 will fall, and through its connections will act to open the supply valves so that the water may flow through the purifier and thence to the pump 10 by which it is returned to the tank D.

It will be understood that any suitable filter or purifier may be employed at E, or in conjunction therewith.

As here shown, the chamber C has a series of superposed tables or surfaces 18, with means to allow the water to flow alternately from opposite edges to the tables below, the heat and movement serving to increase the affinity and intimate union of the water and chemicals. From the bottom of the chamber C a pipe 19 delivers the water into the lower part of the filter chamber 20 through which it rises and deposits sediment and impurities upon the filtering medium contained in said chamber.

Steam to actuate the pump 10 is supplied through a pipe 21 and controlling valve at 22. The opening and closing of this valve may be effected by means of a float 23 located in a chamber 20' above the filter chamber 20, and moved up or down by the rise or fall of the water therein. The lever of the float is connected with the stem 24 of the steam controlling valve 22 so that when the chamber fills the valve is opened to supply steam to the pump and water is drawn through the pipe 9 and delivered through a pipe 25 to a pressure filter 26, and thence through a pipe 27 into the pure water chamber D. The floats and water and steam valves thus operate in unison.

Having thus described my invention, what I claim and desire to secure by Letters-Patent, is—

1. The combination in a water purifying apparatus, of tanks adapted to independently contain unpurified water and chemicals, independent valve chambers through which the water and chemicals may flow, valves contained within the chambers designed to deliver a proportional mixture, a unitary connection common to both valves a purifier and filter through which the mixed liquids are caused to pass, a purified water-container, means to deliver the water thereinto, and means by which the valves are automatically simultaneously opened and closed.

2. In a water purifier, tanks adapted to contain chemicals and unpurified water, valve chambers and valves through which water may pass, a similar chamber and valve through which the chemicals may pass, said valves being axially alined, a pipe or passage within which the chemicals and water are united in proper proportions, filtering and purifying means through which the water passes, a tank into which the purified water is delivered, a float located within the tank, a fulcrumed lever arm connected with the float, a connection between said lever arm and the first-named valves, and a single stem connecting said valves with the second-named valve.

3. A water purifying apparatus including a tank for purified water, a float adapted to rise and fall with the rise and fall of the water within the tank, valve chambers and valves through which unpurified water and purifying chemicals are caused to flow in desired proportions, said valves being axially in line and connected to move in unison in the same direction, and connections between the float and said valves whereby the valves are simultaneously and proportionally opened or closed.

4. A water purifying apparatus including a tank for purified water, a float adapted to rise and fall with the rise and fall of the water within the tank, valve chambers and valves through which unpurified water and purifying chemicals are caused to flow in desired proportions, said valves being axially in line and connected to move in unison in the same direction, connections between the float and said valves whereby the valves are simultaneously and proportionally opened or closed, a purifying and filtering chamber, a pump, and means controlled by the supply of filtered water in said chamber to admit steam to actuate the pump.

5. A water purifying apparatus including a tank for purified water, a float adapted to rise and fall with the rise and fall of the water within the tank, valve chambers and valves through which unpurified water and purifying chemicals are caused to flow in desired proportions, said valves being axially in line and connected to move in unison in the same direction, connections between the float and said valves whereby the valves are simultaneously and proportionally opened or closed, a purifying and filtering chamber, a pump connected therewith to deliver purified water to the pure water chamber, a valve controlled steam supply for the pump, and a float in the filtering chamber controlling the movement of the steam valve.

6. A water purifying apparatus including a tank for purified water, a float adapted to rise and fall with the rise and fall of the water within the tank, valve chambers and valves through which unpurified water and purifying chemicals are caused to flow in desired proportions, said valves being axially in line and connected to move in unison in the same direction, connections between the float and said valves whereby the valves are simultaneously and proportionally opened or closed, a purifying and filtering chamber, a pump connected therewith to deliver purified water to the pure water chamber, a valve controlled steam supply for the pump, a float in the filtering chamber controlling the movement of the steam valve, and a pressure filter located between the pump and the pure water chamber, with intermediate connections.

In testimony whereof I have hereunto set my hand in the presence of two subscribing witnesses.

GEORGE F. DAY.

Witnesses:
CHARLES EDELMAN,
C. C. COOK.

---

Copies of this patent may be obtained for five cents each, by addressing the "Commissioner of Patents, Washington, D. C."